(12) United States Patent
Imagawa et al.

(10) Patent No.: US 10,359,070 B2
(45) Date of Patent: Jul. 23, 2019

(54) SEAL STRUCTURE AND CONTROL CABLE UNIT

(71) Applicant: HI-LEX CORPORATION, Hyogo (JP)

(72) Inventors: Takuma Imagawa, Hyogo (JP); Atsushi Nishimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 15/522,923

(22) PCT Filed: Oct. 28, 2015

(86) PCT No.: PCT/JP2015/080351
§ 371 (c)(1),
(2) Date: Apr. 28, 2017

(87) PCT Pub. No.: WO2016/068173
PCT Pub. Date: May 6, 2016

(65) Prior Publication Data
US 2017/0314609 A1    Nov. 2, 2017

(30) Foreign Application Priority Data

Oct. 29, 2014   (JP) .................. 2014-220280

(51) Int. Cl.
*F16C 1/10*        (2006.01)
*F16J 15/10*       (2006.01)
(Continued)

(52) U.S. Cl.
CPC .............. *F16C 1/107* (2013.01); *F16C 1/101* (2013.01); *F16C 1/267* (2013.01); *F16J 15/104* (2013.01); *F16J 15/168* (2013.01); *F16J 15/50* (2013.01)

(58) Field of Classification Search
CPC .......... F16C 1/107; F16C 1/101; F16C 1/267; F16C 1/108; F16C 1/103; F16J 15/104;
(Continued)

(56) References Cited

U.S. PATENT DOCUMENTS 3,038,730 A * 6/1962 Bentley .................. B64C 13/02
                                                   277/507
5,453,579 A * 9/1995 Cohea .................... H02G 3/083
                                                      16/2.1

FOREIGN PATENT DOCUMENTS

JP       2006-266284 A    10/2006
JP       2009-068518 A     4/2009
WO       2013118774 A1     8/2013

OTHER PUBLICATIONS

International Search Report from International Application No. PCT/JP2015/080351 dated Jan. 19, 2016.

* cited by examiner

*Primary Examiner* — Thomas C Diaz
(74) *Attorney, Agent, or Firm* — Brundidge & Stanger, P.C.

(57) ABSTRACT

A seal structure includes an insertion path which connects between a first opening and a second opening and through which a longitudinal member is inserted; and a seal part, formed at the intermediate section of the insertion path, which contacts with the outer circumference of the inserted longitudinal member. A discharge path is provided on a side wall section of the insertion path, and connects from the side surface of the side wall section to a section, of the insertion path, which is closer to an inflow opening through which flowing water is likely to flow than the seal part is to the inflow opening. The discharge path is structured in communication with a gap, formed between the outer circumference of the longitudinal member and the inner surface of the
(Continued)

insertion path, which allows for inflow of flowing water along the direction in which the longitudinal member is inserted

7 Claims, 8 Drawing Sheets

(51) Int. Cl.
 *F16J 15/50* (2006.01)
 *F16C 1/26* (2006.01)
 *F16J 15/16* (2006.01)
(58) Field of Classification Search
 CPC .......... F16J 15/168; F16J 15/50; F16J 15/025; B60R 16/0222; B60R 13/0846; H02G 3/22; F16L 5/10
 See application file for complete search history.

SEAL STRUCTURE AND CONTROL CABLE UNIT

TECHNICAL FIELD

The present invention relates to a seal structure and a control cable unit.

BACKGROUND ART

In a vehicle such as an automobile, a control cable is routed to pass through between the inside and outside of the vehicle in order for a driver inside the vehicle to perform a pulling operation of an operation lever and to transmit the pulling operation to a device outside the vehicle. For this reason, a wall separating the inside and outside of the vehicle needs to have a hole for passing the control cable through the wall, and a structure is also needed in which no dust or water or the like enters from this cable-passing portion of the wall (see, e.g., Patent Literature (hereinafter, referred to "PTL") 1). Grommets are mostly used for such a structure.

CITATION LIST

Patent Literature

PTL 1
Japanese Patent Application Laid-Open No. 2009-68518

SUMMARY OF INVENTION

Technical Problem

When misalignment between the axis of a grommet and the axis of a control cable occurs in arrangement of the control cable at the time of mounting to the vehicle, a gap is generated between the grommet and the control cable, and water enters inside the vehicle from the generated gap, however. Even when such misalignment between the axes is prevented, however, high pressure water flowing along the control cable that is exposed outside deforms the grommet and thereby enters from the gap between the grommet and the control cable in a case where the control cable and the grommet are lightly in contact with each other.

Meanwhile, when an insertion passage of the grommet through which the control cable is inserted is formed so as to tightly hold the control cable, water entry can be prevented. With this configuration, however, insertion of the control cable becomes difficult.

It is therefore an object of the present invention to provide a seal structure through which a long member such as a control cable is inserted and which seals the long member, and also to provide a control cable unit. This seal structure provided herein prevents water entry without forming an insertion passage for the long member to have a small inner diameter.

Solution to Problem

A seal structure according to an aspect of the present invention is a structure including a long member and a seal member having an insertion portion through which the long member is inserted, in which: the insertion portion includes: a first opening from which the long member is inserted, a second opening from which the long member having been inserted from the first opening extends out, an insertion passage which connects between the first and the second openings and through which the long member is inserted, and an end wall portion which includes an end surface facing an insertion direction of the long member and which is provided with an inflow opening which is one of the first and the second openings and through which flowing water possibly flows in, a side wall portion including a side surface intersecting with the end surface of the end wall portion, and a seal portion formed at a middle portion of the insertion passage and coming into contact with an outer periphery of the inserted long member, in which: the end wall portion is provided to block the flowing water flowing along the insertion direction of the long member from directly hitting the side surface of the side wall portion, the side wall portion is provided with a drain passage connecting the side surface of the side wall portion to a portion in the insertion passage, the portion being closer to the inflow opening than the seal portion is, and the drain passage communicates with a gap which is formed between the outer periphery of the long member and an inner surface of the insertion passage and which is a space through which the flowing water possibly flows in along the insertion direction of the long member.

Advantageous Effects of Invention

According to the present invention, it is made possible to prevent the water having entered between a long member and an insertion passage along a control cable from entering an inner side of a seal.

DESCRIPTION OF EMBODIMENTS

Hereinafter, an embodiment of the present invention will be described in detail with reference to the accompanying drawings.

Embodiment

Figure 1:
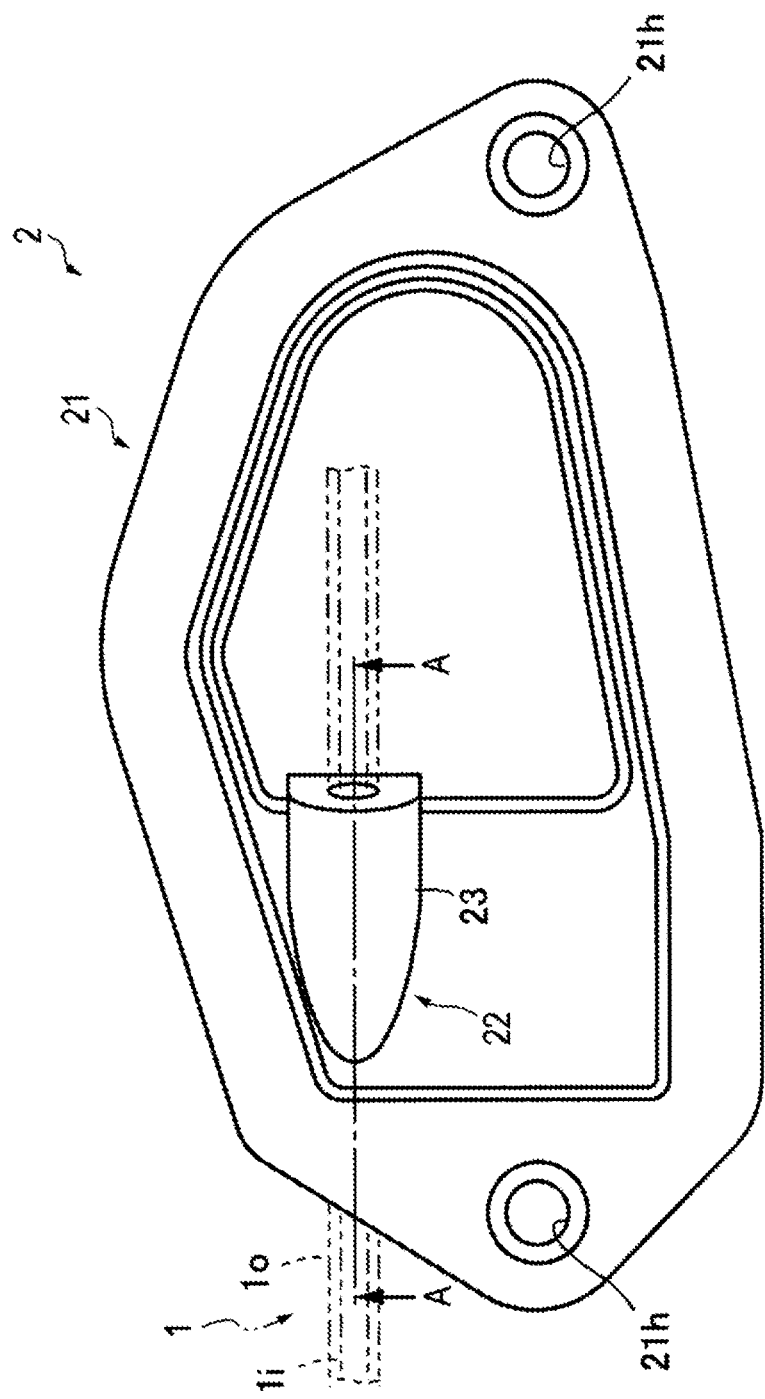
FIG. 1 is a top view illustrating a grommet according to an embodiment of the present invention.
Figure 2:
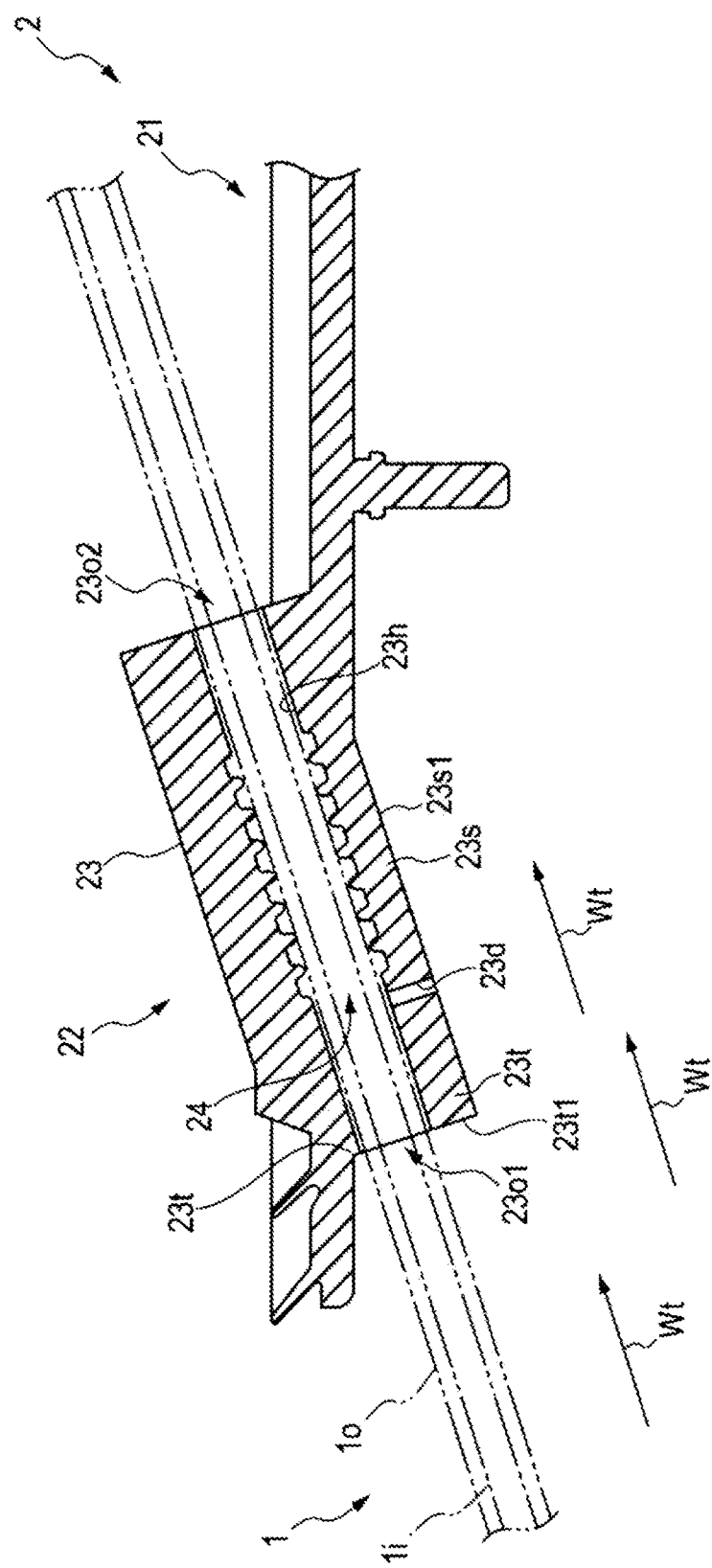
FIG. 2 is a cross-sectional view taken along line A-A of FIG. 1.

FIG. 1 is a top view illustrating a grommet according to an embodiment of the present invention. FIG. 2 is a cross-sectional view taken along line A-A of FIG. 1. Note that, alternate long and two short dashes lines in the drawings represent control cable 1.

A long member refers to control cable 1, in particular, outer casing 1o. Control cable 1 includes inner cable 1i and outer casing 1o covering this inner cable 1i. However, the long member is not limited to any particular configuration and may be inner cable 1i, a power transmission line, a communication line, and/or the like, for example. As for the long member, it is possible to employ a member having a predetermined length and disposed to pass through inner and outer sides such as the inside and outside of a vehicle, and it is preferable that an outer peripheral surface of this member be a smooth and flat surface.

Grommet 2 (corresponding to a seal member) is configured to hold control cable 1 in a state of being attached to a wall or the like that separates the inside and outside of an automobile. Grommet 2 includes body portion 21 and insertion portion 22 provided at this body portion 21. Note that, grommet 2 is formed of an elastic material (such as ethylene-propylene-diene (EPDM) rubber). However, the material of grommet 2 is not limited to any particular material, and may be, for example, nitrile rubber (NBR) or chloroprene rubber (CR) or the like. In addition, a material obtained by incorporating an elastic material into some part of a non-elastic material may be adopted. In this case, one that is obtained by attaching insertion portion 22 formed of rubber to body portion 21 formed of metal, for example, by baking may be adopted. As an elastic member, any member may be used as long as the member has an elastic function so that the member can come into close contact with outer casing 1o. In this embodiment, a structure including control cable 1 (long member), and grommet 2 (seal member) having the insertion portion through which control cable 1 is inserted is referred to as a seal structure.

Body portion 21 refers to a flat and broad portion of grommet 2. Body portion 21 is formed in a polygonal shape and covers a cable hole provided in the wall separating the inside and outside of the automobile. In addition, body portion 21 is provided with two bolt holes 21h and fixed to the wall by bolts passed through these two bolt holes 21h.

Insertion portion 22 is a portion where control cable 1 is inserted through, and in this embodiment, insertion portion 22 includes a portion where cylindrical portion 23 is formed in grommet 2. Cylindrical portion 23 includes insertion passage 23h extending in an axial direction of cylindrical portion 23 and holds control cable 1 arranged up to the cable hole and inserted through insertion passage 23h. In addition, insertion passage 23h includes seal portion 24 provided at an inner wall of insertion passage 23h and seals control cable 1 by this seal portion 24. More specifically, insertion passage 23h includes seal portion 24 at the inner wall of insertion passage 23h and seals an outer periphery of outer casing 1o by protruding portions of seal portion 24.

Insertion portion 22 includes openings 23o, and openings 23o include first opening 23o1 and second opening 23o2. Moreover, insertion portion 22 includes end wall portion 23t and side wall portion 23s. End wall portion 23t includes end surface 23t1 facing an insertion direction of control cable 1 and is provided on a side of first opening 23o1 which is an opening side located outside the vehicle among both openings 23o. In this embodiment, first opening 23o1, which is the opening located outside the vehicle, is an inflow opening through which flowing water Wt possibly flows in. Accordingly, when flowing water Wt flows along control cable 1 toward first opening 23o1, which is the inflow opening, flowing water Wt hits end surface 23t1. Furthermore, side surface 23s1 of side wall portion 23s is provided so as to intersect with end surface 23t1 of end wall portion 23t, and end wall portion 23t blocks the flowing water that flows along the insertion direction of control cable 1 from directly hitting side wall 23s1 of side wall portion 23s. However, end surface 23t1 of end wall portion 23t and side surface 23s1 of side wall portion 23s may be orthogonal to each other or an angle formed by these surfaces may be an acute angle. With this configuration, flowing water Wt mainly hits end surface 23t1 of end wall portion 23t and thus can be suppressed from directly hitting side surface 23s1, which faces the outside of the vehicle, of side wall portion 23s forming at least part of a cylindrical side surface. Moreover, side wall portion 23s is provided with drain passage 23d for draining the water that has entered insertion passage 23h.

Drain passage 23d communicates between a portion in insertion passage 23h which is closer to the inflow opening than seal portion 24 is, and the outside of side surface 23s1 of side wall portion 23s. More specifically, drain passage 23d communicates between a gap formed between the outer periphery of control cable 1 and an inner surface of insertion passage 23h, and the opening formed in an outer surface of side surface 23s1. Flowing water Wt can flow in this gap along the insertion direction of control cable 1 from first opening 23o1, which is the inflow opening. Drain passage 23d drains flowing water Wt that has flown in this gap. Drain passage 23d is provided so as to extend in a direction orthogonal to the insertion direction of control cable 1. As described above, providing drain passage 23d allows the water that has entered insertion passage 23h to be drained from drain passage 23d, thus making it possible to reduce pressure in insertion passage 23h. Accordingly, no water pressure is applied to seal portion 24, and thus the seal efficiency can be maintained.

Figure 3:
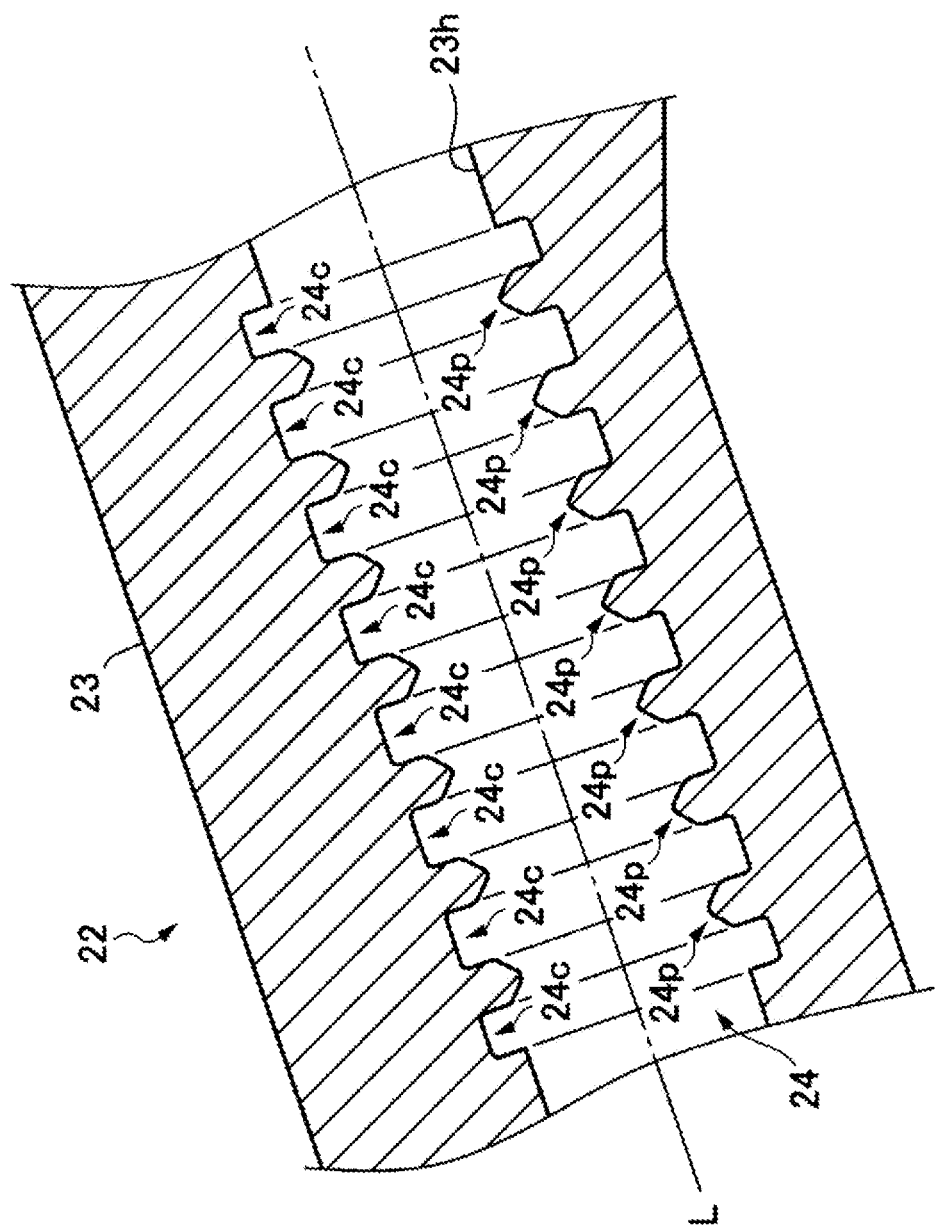
FIG. 3 is a partially enlarged cross-sectional view of an insertion portion of the grommet in the cross section of FIG. 2.
Figure 4:
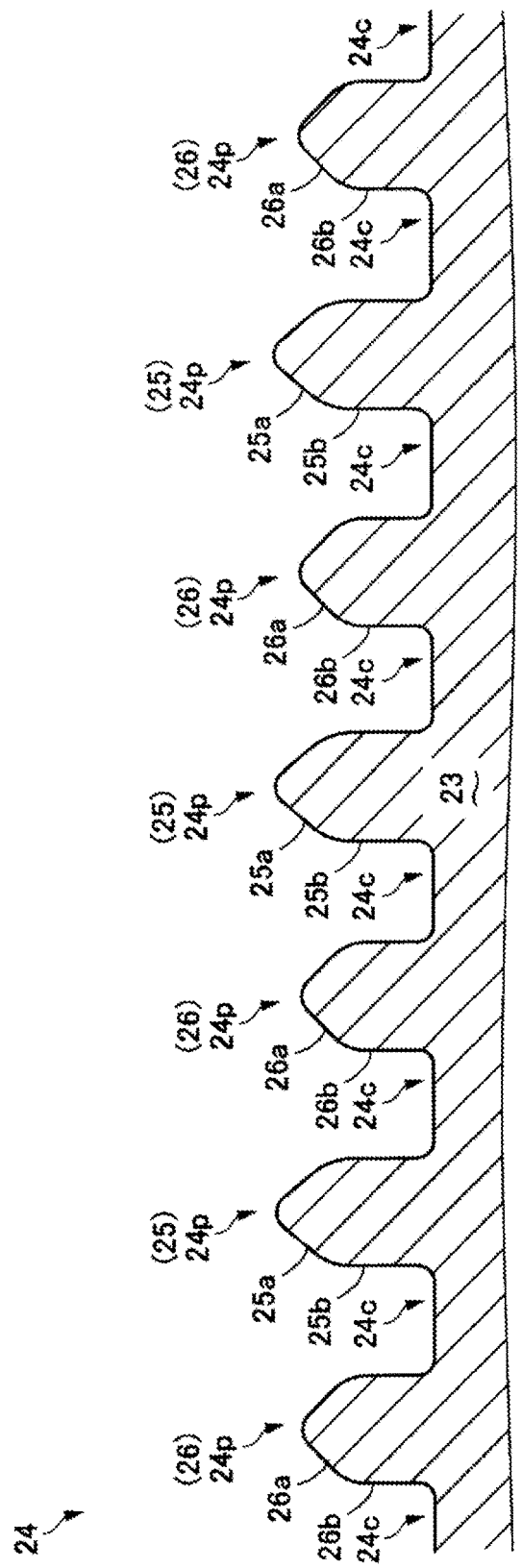
FIG. 4 is an explanatory diagram illustrating unevenness provided in a seal portion of FIG. 3.

Next, a detailed description will be given of insertion portion 22 using FIGS. 3 and 4. FIG. 3 illustrates insertion portion 22 of grommet 2. FIG. 4 illustrates unevenness provided in seal portion 24.

As described above, insertion portion 22 includes a portion where cylindrical portion 23 is formed in grommet 2. Cylindrical portion 23 includes openings 23o at both ends thereof (see FIG. 2). Openings 23o are each formed to have a size that allows control cable 1 to be inserted, and in this embodiment, each opening 23o is formed in a circular shape although it is not limited to any particular shape. In addition, insertion passage 23h is formed so as to communicate between first opening 23o1 and second opening 23o2. More specifically, cylindrical portion 23 has a shape in which insertion passage 23h is formed to pass through a space between one of openings 23o and the other one of openings 23o. In cylindrical portion 23 formed in the manner described above, control cable 1 is inserted from one of openings 23o, and then inserted control cable 1 passes through insertion passage 23h and extends out from the other one of openings 23o. Insertion passage 23h is provided with seal portion 24 at a middle portion of the inner wall thereof and seals an outer periphery of outer casing 1o by protruding portions 24p of this seal portion 24 in contact with the outer periphery of outer casing 1o. Seal portion 24 is provided in such a manner that protruding portions 24p are axially apart from each other, and seals the outer periphery of outer casing 1o so that moisture is prevented from moving along the outer periphery of outer casing 1o to an inner side, thereby making it possible to exert waterproofing performance. Note that, how insertion passage 23h is provided is not limited to any particular manner as long as insertion passage 23h is provided to allow control cable 1 to be routed through the inside and outside of an automobile, and in this embodiment, insertion passage 23h is formed in a cylindrical shape.

In this grommet 2, seal portion 24 includes unevenness, and recess portions 24c each provided between protruding portions 24p are formed in a ring shape about center axis L of insertion passage 23h. All recess portions 24c have an identical depth. Meanwhile, protruding portions 24p of the unevenness are formed in a ring shape about center axis L of insertion passage 23h. Moreover, protruding portions 24p are provided in parallel along insertion passage 23h. However, it is not necessary that all protruding portions 24p have an identical height. More specifically, protruding portions 24p in grommet 2 may include two types of protruding portions 24p, which are one with a higher height and the other with a lower height. In this embodiment, protruding portion 24p with a higher height is defined as "first protruding portion 25 (corresponding to primary seal portion)" and protruding portion 24p with a lower height is defined as "second protruding portion 26 (corresponding to secondary seal portion)."

First protruding portions 25 each come into close contact with control cable 1 and seal control cable 1. More specifically, first protruding portion 25 comes into close contact with outer casing 1o of control cable 1, and thereby seals against moisture such as rain water moving along outer casing 1o. First protruding portions 25 may have resistance to insertion that does not deteriorate the insertability of grommet for outer casing to and may be configured to have a shape capable of coming into close contact with an outer shape of outer casing 1o. Note that, the term "come into close contact with" means a state where first protruding portion 25 having elastically deformed presses hard against an outer periphery of outer casing 1o, so that the pressure of the contact portion increases. In terms of functionality, this term means a state where it is possible to surely seal against moisture such as rain water. Note that, since first protruding portions 25 have a role of sealing against moisture such as rain water, first protruding portions 25 are always formed in a circumferentially ring shape and do not include a spiral.

Figure 5:
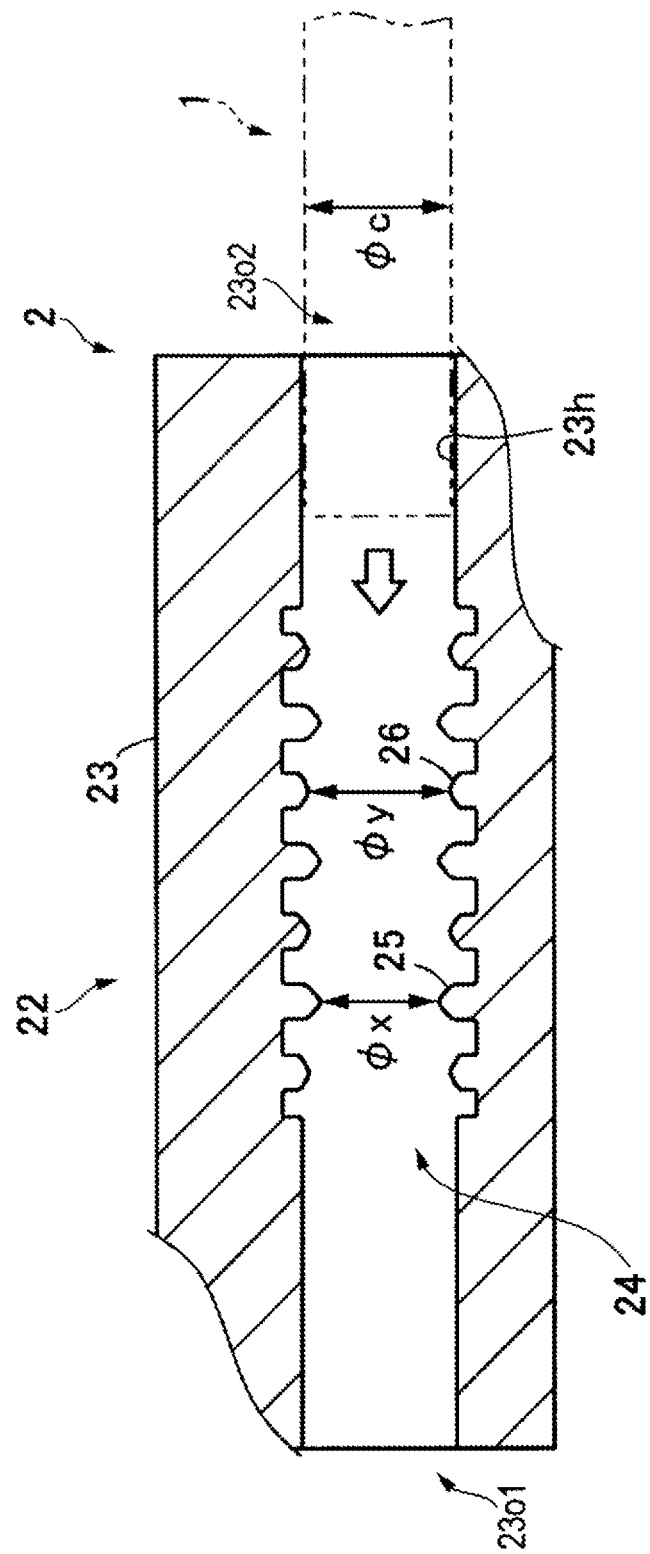
FIG. 5 is a partially enlarged view illustrating the insertion portion before insertion of a control cable.

In first protruding portion 25, a cross-sectional shape of base portion 25b is substantially rectangular. Furthermore, top portion 25a has a substantially wedge shape in which top portion 25a is tapered as a cross-sectional shape of top portion 25a nears center line L. More specifically, the cross-sectional shape of first protruding portion 25 extends perpendicularly toward center line L from a bottom of recess portion 24c and is tapered starting from a predetermined height. This shape is adopted for the purpose of adequately suppressing rigidity of a root portion and of reducing a contact area with control cable 1. This increases flexibility of first protruding portion 25 and simultaneously achieves an improvement in the sealing function. Meanwhile, the flexibility of first protruding portion 25 can be increased by forming recess portion 24c with a greater depth. Note that, inner diameter φx of top portion 25a of first protruding portion 25 is between 99% and 65% of outer diameter φc of control cable 1 (see FIG. 5). The numerical value of inner diameter φx is calculated by the following expression.

φx/φc×100=99 to 65(%)              Expression:

A ratio of inner diameter φx to outer diameter φc can be practically within a range of 65% to 99% both inclusive. However, in order to improve workability while securing the seal efficiency, the ratio is preferably within a range of 87% to 95% both inclusive.

Note that, the term "top portion" means a portion around a top of first protruding portion 25, which is closest to an axis side in a portion of first protruding portion 25 protruding in the axial direction of insertion passage 23h. This portion is a portion which comes into contact with the outer periphery of outer casing 1o and where elastic deformation of first protruding portion 25 occurs at the time of insertion of control cable 1. In this embodiment, as described above, this portion is configured to have a protruding shape, and in cases of first protruding portions 25 as well as second protruding portions 26 to be described hereinafter, the inner diameter is defined with reference to a leading end of the protruding portion.

Second protruding portions 26 each come into contact with control cable 1 and seal control cable 1. More specifically, second protruding portion 26 comes into contact with outer casing 1o of control cable 1, and thereby seals against moisture such as rain water moving along outer casing 1o. Note that, the term "come into contact with" means a state where second protruding portion 26 having elastically deformed lightly presses against the outer periphery of outer casing 1o, so that the pressure of the contact portion somewhat increases. In terms of functionality, this term means a state where it is possible to auxiliary seal against moisture such as rain water while insertion of control cable 1 is made easy. Note that, since second protruding portions 26 have a role of sealing against moisture such as rain water, second protruding portions 26 are preferentially formed in a circumferentially ring shape about center axis L of insertion passage 23h. However, as long as first protruding portions 25 can secure the sealing function, second protruding portions 26 are not necessarily formed in a ring shape.

In second protruding portion 26, a cross-sectional shape of base portion 26b is substantially rectangular. Furthermore, top portion 26a has a substantially wedge shape in which top portion 26a is tapered as a cross-sectional shape of top portion 26a nears center line L. More specifically, the cross-sectional shape of second protruding portion 26 extends perpendicularly toward center axis L from a bottom of recess portion 24c and is tapered starting from a predetermined height. This shape is adopted for the purpose of adequately suppressing rigidity of a root portion and of reducing the contact area with control cable 1. This increases flexibility of second protruding portion 26 and simultaneously achieves an improvement in the sealing function. Meanwhile, the flexibility of second protruding portion 26 can be increased by forming recess portion 24c with a greater depth. Regarding the height of second protruding portion 26 from the bottom of recess portion 24c of second protruding portion 26, second protruding portion 26 is configured to have a height that allows second protruding portion 26 to come into contact with the outer periphery of outer casing 1o which is a direct seal target and configured not to generate resistance to insertion and not to elastically deform at the time of insertion of control cable 1 by setting inner diameter φy of second protruding portion 26 to be larger than inner diameter φx of first protruding portion 25. Note that, inner diameter φy of top portion 26a of second protruding portion 26 is between 100 percent and 92 percent of outer diameter φc of control cable 1 (see FIG. 5). This numerical value of the inner diameter φy is calculated by the following expression.

φy/φc×100=100 to 92(%)              Expression:

In this embodiment, while outer diameter φc of outer casing 1o is 7.1 mm, inner diameter φx of first protruding portion 25 is set to 6.4 mm, and inner diameter φy of second protruding portion 26 is set to 6.8 mm As described above, drain passage 23d is provided in the seal structure of this embodiment. This drain passage 23d connects between side surface 23s1 of side wall portion 23s that forms insertion passage 23h and a portion in insertion passage 23h which is closer to the inflow opening than seal portion 24 is. This structure allows the water that has entered insertion passage 23h to be drained from drain passage 23d to reduce pressure in insertion passage 23h and thereby prevents seal portion 24 from being applied with water pressure, thus making it possible to maintain the sealing efficiency. For this reason, it is made possible to prevent the water that has entered between control cable 1 and insertion passage 23h from entering an inner side of seal portion 24 without forming insertion passage 23h to have a small inner diameter.

<Variation>

Figure 6:
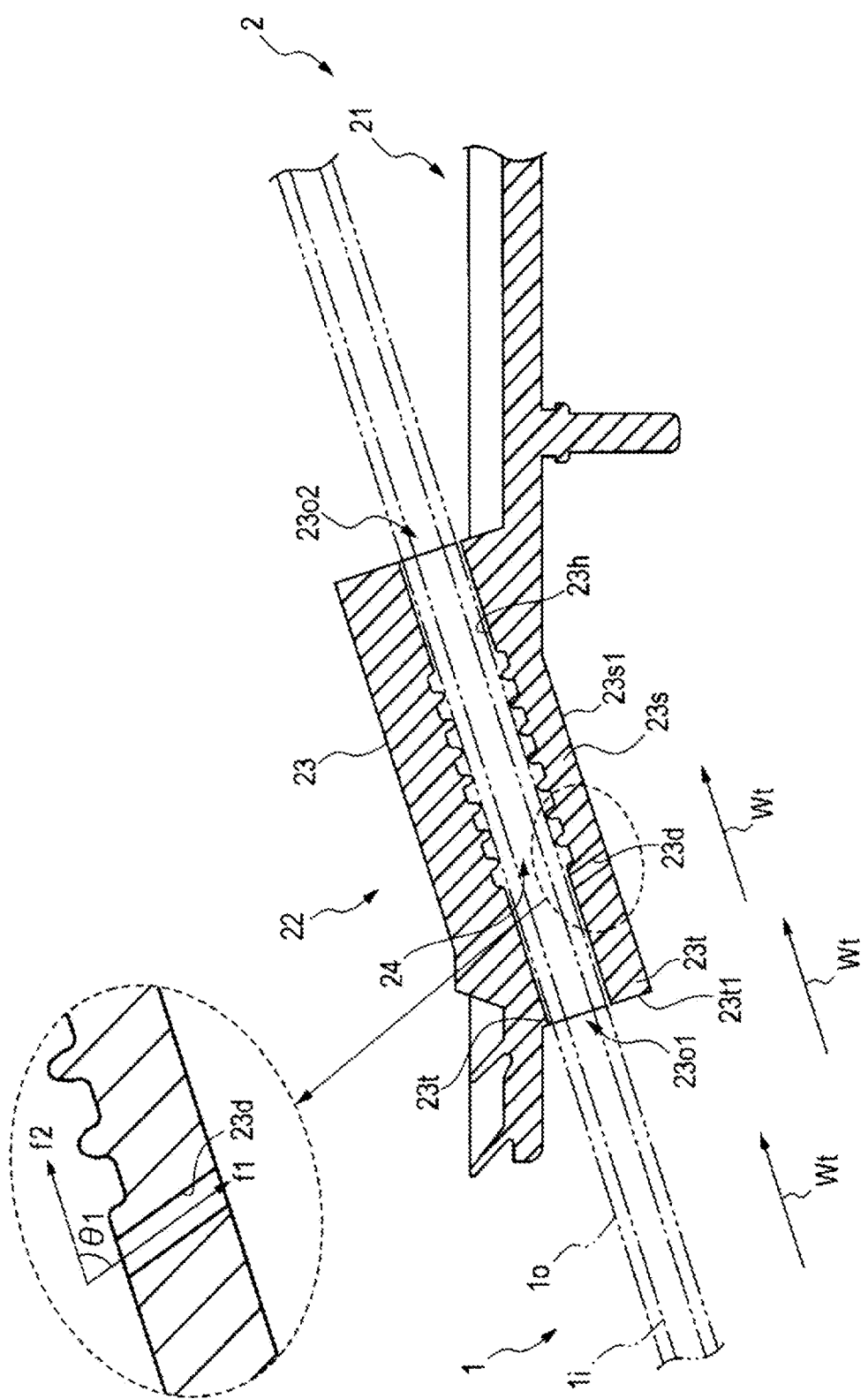
FIG. 6 is a cross-sectional view taken along line A-A of FIG. 1 in a case where a direction of a drain passage is changed.

In the embodiment described above, a case has been described where the drain passage is provided so as to extend orthogonally to the insertion direction of control cable 1. The present invention is not limited to this case, however. As illustrated in FIG. 6, for example, drain passage 23d may be provided such that angle θ1 formed by direction f1 of the drain passage in a direction from a side of insertion passage 23h toward a side of side surface 23s1 and direction f2 of insertion passage 23h in a direction from a side of inflow opening 23o toward a side of opening 23o at the other end is an acute angle.

Figure 7:
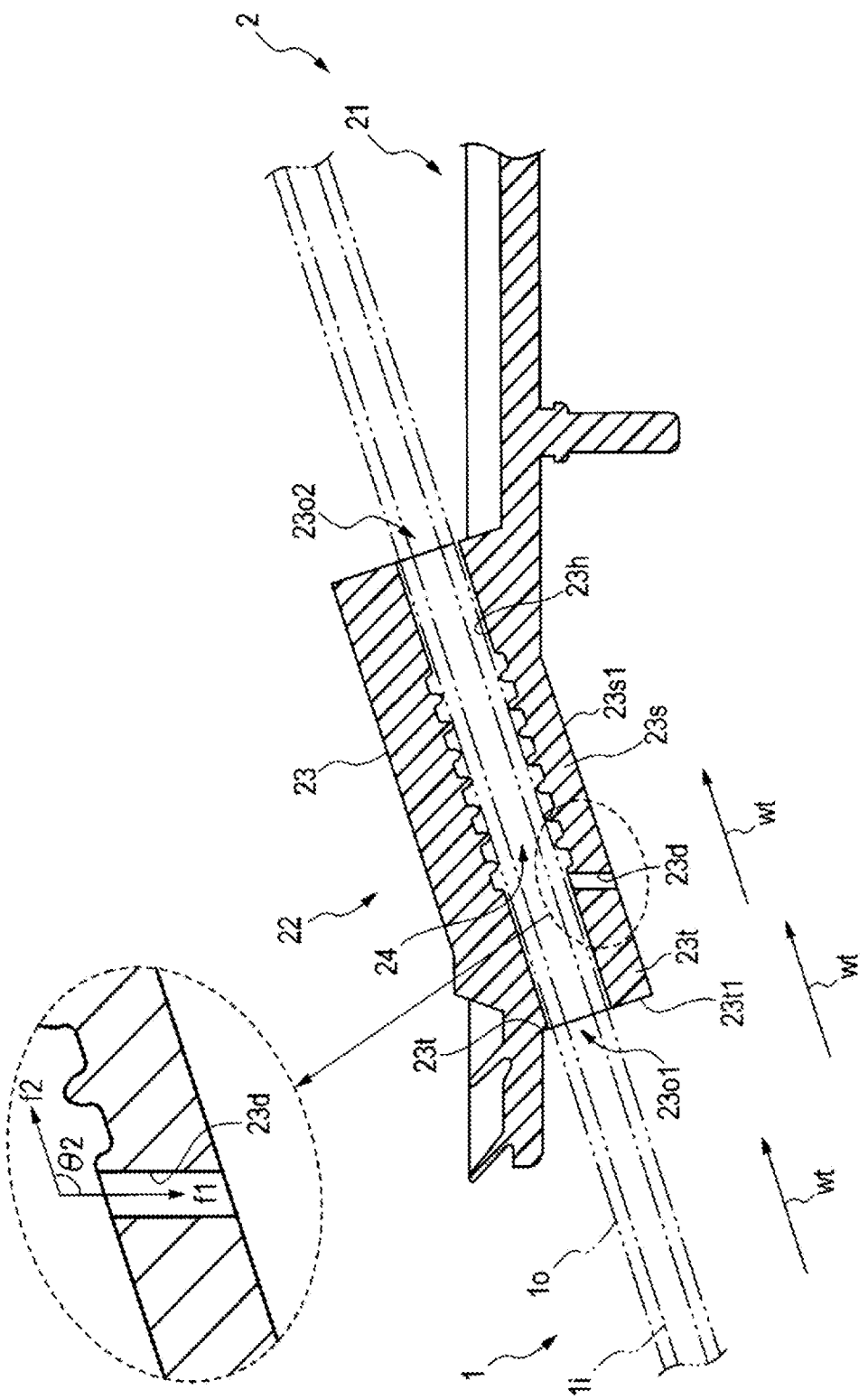
FIG. 7 is a cross-sectional view taken along line A-A of FIG. 1 in a case where a direction of the drain passage is changed.

Moreover, as illustrated in FIG. 7, for example, drain passage 23d may be provided such that angle θ2 formed by direction f1 of the drain passage in the direction from a side of insertion passage 23h toward a side of side surface 23s1 and direction f2 of insertion passage 23h in the direction from a side of inflow opening 23o toward a side of opening 23o at the other end is an obtuse angle.

Figure 8:
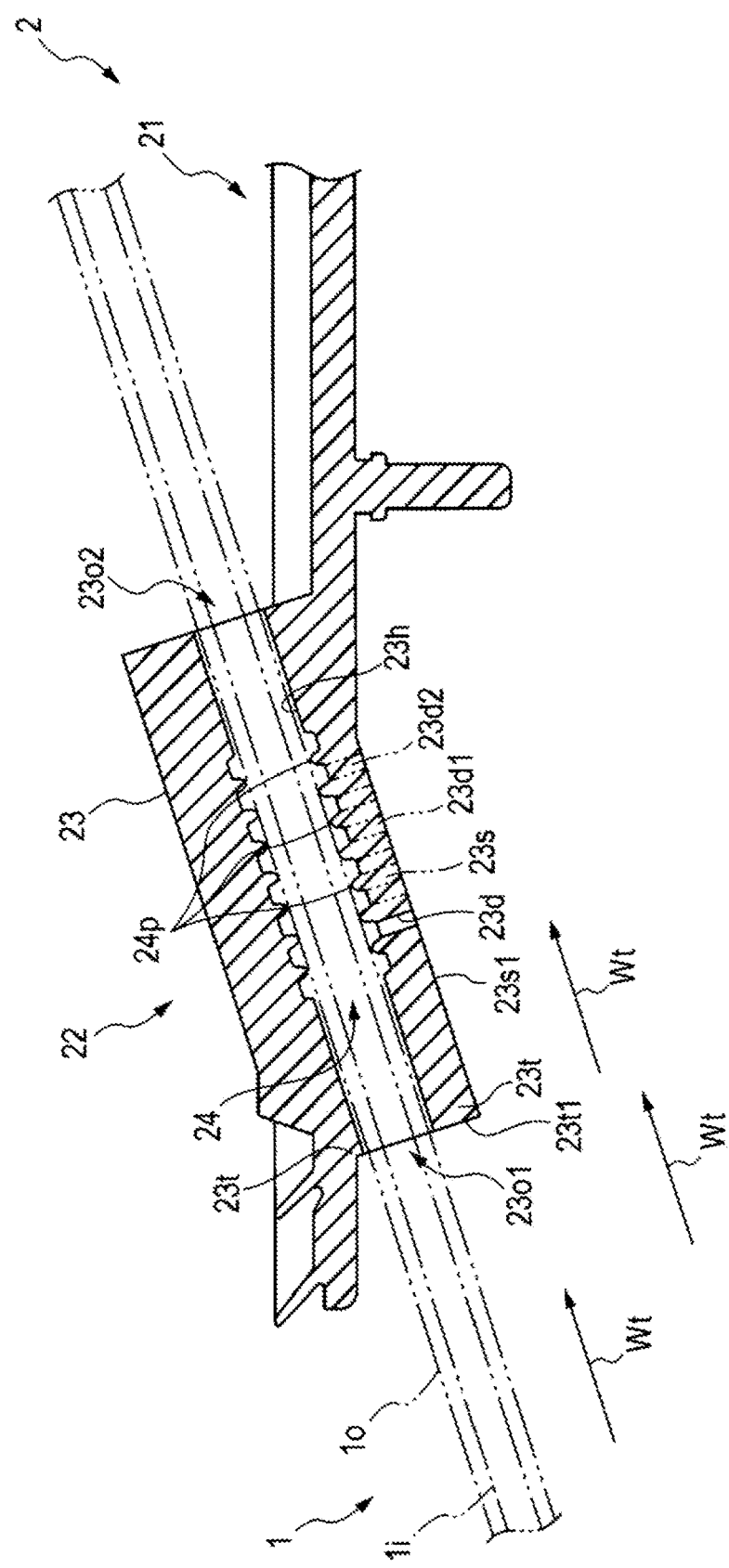
FIG. 8 is a cross-sectional view taken along line A-A of FIG. 1 in a case where a position of the drain passage is changed.

In the embodiment described above, a case has been described where drain passage 23d is connected to insertion passage 23h at a position closer to the inflow opening than seal portion 24 that is closest to the inflow opening is. The present invention is not limited to this case, however. More specifically, as illustrated in FIG. 8, drain passage 23d (23d1, 23d2) may be connected to a portion in insertion passage 23h that is closer to the inflow opening than at least one of a plurality of protruding portions 24p forming seal portion 24 is.

In the embodiment described above, the case has been described where drain passage 23d is connected to insertion passage 23h at a position closer to the inflow opening than seal portion 24 that is closest to the inflow opening is. The present invention is not limited to this case, however. More specifically, drain passage 23d may be connected to insertion passage 23h at a position closer to the inflow opening than at least one of a plurality of primary seal portions is.

INDUSTRIAL APPLICABILITY

The present invention is applicable to a seal structure and a control cable unit.

REFERENCE SIGNS LIST

1 Control cable (long member)
1i Inner cable
1o Outer casing
2 Grommet (elastic member)
21 Body portion
22 Insertion portion
23 Cylindrical portion
23t End wall portion
23s Side wall portion
23d Drain passage
23h Insertion passage
24 Seal portion
24c Recess portion
24p Protruding portion
25 First protruding portion
26 Second protruding portion
Wt Flowing water
φx Inner diameter of top portion of first protruding portion
φy Inner diameter of top portion of second protruding portion
φc Outer diameter of control cable

The invention claimed is:

1. A seal structure including a long member and a seal member having an insertion portion through which the long member is inserted;
the insertion portion comprising:
a first opening from which the long member is inserted,
a second opening from which the long member having been inserted from the first opening extends out,
an insertion passage which connects between the first and the second openings and through which the long member is inserted,
an end wall portion which includes an end surface facing an insertion direction of the long member and which provided with an inflow opening which is one of the first and the second openings and through which flowing water possibly flows in,
a side wall portion including a side surface intersecting with the end surface of the end wall portion, and
a seal portion formed at a middle portion of the insertion passage and coming into contact with an outer periphery of the inserted long member;
wherein:
the end wall portion is provided to block the flowing water flowing along the insertion direction of the long member from directly hitting the side surface of the side wall portion;
the side wall portion is provided with a drain passage connecting the side surface of the side wall portion to a portion in the insertion passage, the portion being closer to the inflow opening than the seal portion is;
the drain passage communicates with a gap which is formed between the outer periphery of the long member and an inner surface of the insertion passage and which is a space through which the flowing water possibly flows in along the insertion direction of the long member;
the seal portions include a plurality of primary seal portions and a plurality of secondary seal portions lower than the primary seal portions; and
the drain passage and the insertion passage are connected to each other at a position of the insertion passage, the position being closer to the inflow opening than at least one of the primary seal portions is.

2. The seal structure according to claim 1, wherein the drain passage is provided to extend in a direction orthogonal to the insertion direction of the long member.

3. The seal structure according to claim 1, wherein the drain passage is provided such that an angle formed by a direction of the drain passage in a direction from a side of the insertion passage toward a side of the side surface and a direction of the insertion passage in a direction from a side of the inflow opening toward a side of the other opening at the other end is an acute angle.

4. The seal structure according to claim 1, wherein
the drain passage is provided such that an angle formed by a direction of the drain passage in a direction from a side of the insertion passage toward a side of the side surface and a direction of the insertion passage in a direction from a side of the inflow opening toward a side of the other opening at the other end is an obtuse angle.

5. The seal structure according to claim 1, wherein
the seal portion has a ring shape and the primary seal portions and the secondary seal portions are provided in parallel along the insertion passage.

6. The seal structure according to claim 1, wherein:
an inner diameter of a top portion of each of the primary seal portions is between 65% and 99% of an outer diameter of the long member, and
an inner diameter of a top portion of each of the secondary seal portions is between 92% and 100% of an outer diameter of the long member.

7. A control cable unit including the seal structure according to claim 1, wherein:
the control cable unit comprises:
a control cable, as the long member, including an inner cable and an outer casing housing the inner cable, and
a grommet as the seal member.

\* \* \* \* \*